UNITED STATES PATENT OFFICE.

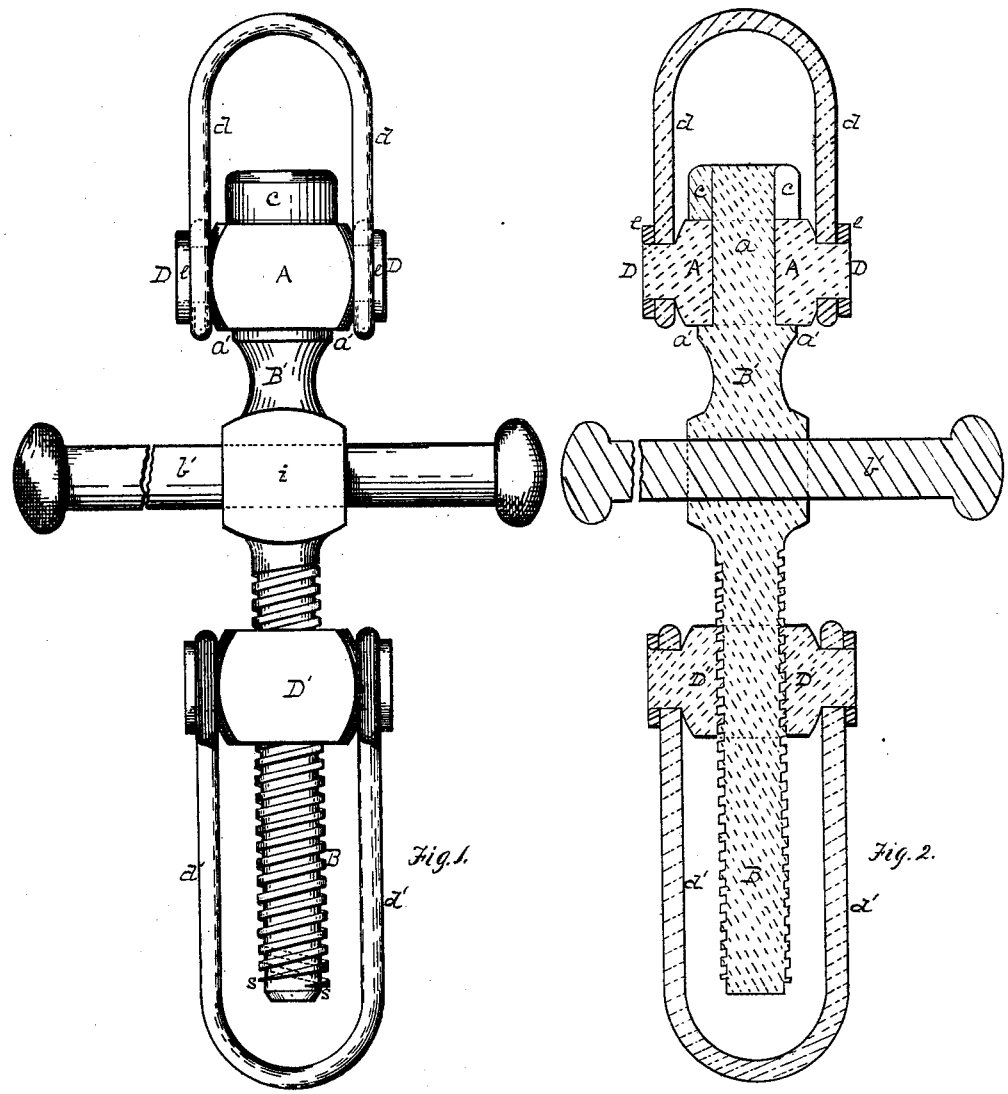

SAMUEL M. FULTON, OF PITTSBURG, PENNSYLVANIA.

IMPROVEMENT IN DRAW-COUPLINGS FOR BOATS &c.

Specification forming part of Letters Patent No. 185,634, dated December 26, 1876; application filed December 1, 1876.

*To all whom it may concern:*

Be it known that I, SAMUEL M. FULTON, of Pittsburg, county of Allegheny, and State of Pennsylvania, have invented or discovered a new and useful Improvement in Draw-Couplings; and I do hereby declare the following to be a full, clear, concise, and exact description thereof, reference being had to the accompanying drawing, making a part of this specification, in which—like letters indicating like parts—

Figure 1 represents a plan view of my improved draw-coupling, and Fig. 2 represents a section of the same.

For sundry purposes in the arts it is necessary to draw and bind two heavy and bulky bodies so closely and tightly together that they shall have little or no play, except in common. This is particularly the case in making up "tows," as they are called, or fleets of boats, barges, flats, &c., in river-navigation, to be towed from one place to another.

My improved draw-coupling is intended for such use. It consists of a rotating shaft, B B', having at one end, B, a threaded stem of any desired length, and at the opposite end, B', a loose block or swivel, A. On the end B', as shown in Fig. 2, is formed the smooth stem $a$ and shoulder $a'$, upon and against which the block A turns. The block is held to its place by the collar $c$, which is securely fastened to the stem in any suitable and convenient way, as by upsetting the end of the stem upon the collar, as shown in Fig. 2, or the collar may be screwed on as a nut, and locked in any way to prevent unscrewing. The block A will thus be free to turn on the stem $a$ as an axis, and, with the U-shaped stirrup or link $d$, will operate as a swivel. The open ends of the stirrup $d$ are pivoted to the trunnions D on the opposite sides of the block A, so as to turn freely, and they may be held in place upon the trunnions by collars $e$, secured as in the case of the collar $c$, or in other convenient way. The threaded end B of the shaft passes and works through a tapped nut, D', and a stirrup or link, $d'$, is pivoted to trunnions on the opposite sides of this nut D', as on the head A.

It is desirable that a "quick" screw should be employed, and instead of using a single coarse thread, as may be done, I prefer to use a double thread—that is, two threads upon the same stem of the same pitch. These threads $s\ s$, as shown at the outer end of the stem B, Fig. 1, begin on opposite sides of the stem, and the continuity of each thread is there shown by dotted lines.

I consider this double thread preferable to a single one, because I can thus use a thread of greater pitch, and consequently a quicker screw, and at the same time secure the requisite strength and ease in working.

Through the block $i$ of the shaft B B' is provided a handle, $b'$, for rotating the shaft.

In order to increase the length of the coupling when desired, cables or hawsers may be attached to the U-shaped stirrups $d\ d'$, and, if preferred, this attachment may be made by the ordinary swivel-joint. In use the coupling is to be extended to its extreme or any desired length, and, the boats or other objects being brought as close together as practicable by hand or other power, the stirrups $d\ d'$, or hawsers thereto attached, are connected to such boats, and the shaft is rotated so as to cause the nut D' and block A to approach each other, and thereby draw the boats together. If the threaded shaft is not long enough to bring them into sufficiently close contact by one complete drawing operation of the coupling, the boats may be lashed together, the coupling be extended, the slack of the hawsers taken up, and the operation repeated.

As a very great power can be exerted by the screw, boats, barges, and other like objects can thus be drawn so closely together that, when properly lashed, they will have little or no play or motion as regards each other. This result is an important one to secure, especially on our western rivers, where large tows or fleets of barges, &c., have to be towed by a single tow-boat along tortuous channels, between narrow bridge-piers, over rapids, and through canal-locks, where the towing power has to be employed frequently in "backing," as well as in going ahead. In order to tow and steer well under such circumstances, it is important that the entire tow or fleet should be a practically solid mass as against all forces acting forward and backward as well as laterally.

I claim herein as my invention—

A draw-coupling, consisting of a shaft, B B', having one or more threads at one end, with a nut working thereon, and a loose block or swivel, A, at the opposite end, the nut and block being provided with stirrups $d\ d'$ and a handle, $b'$, for rotating the shaft, substantially as set forth.

In testimony whereof I have hereunto set my hand.

SAMUEL M. FULTON.

Witnesses:
J. J. McCORMICK,
CLAUDIUS L. PARKER.